235-381 SR

4/9/85 XR 4,510,380

United States Patent [19]

Uchida, deceased et al.

[11] Patent Number: 4,510,380

[45] Date of Patent: Apr. 9, 1985

[54] AUTOMATIC MONEY RECEIVING AND DISBURSING MACHINE

[75] Inventors: Isamu Uchida, deceased, late of Chigasaki, Japan, by Kazuko Uchida, heiress; by Chigusa Fujii, heiress, Tokyo, Japan; Eiichi Kokubo, Tokyo, Japan; Kyoichi Osako, Tokyo, Japan; Makoto Yamazaki, Tokyo, Japan; Shinichi Imura, Tokyo, Japan; Junichi Arikawa, Tokyo, Japan; Kowichi Goi, Tokyo, Japan; Hiroshi Hongou, Tokyo, Japan; Takashi Shinozaki, Tokyo, Japan; Hiroshi Emori, Tokyo, Japan

[73] Assignee: Laurel Bank Machine Co., Ltd., Tokyo, Japan

[21] Appl. No.: 388,983

[22] Filed: Jun. 16, 1982

[30] Foreign Application Priority Data

Jun. 19, 1981 [JP] Japan .................................. 56-95109

[51] Int. Cl.[3] .............................................. G06F 15/30

[52] U.S. Cl. ........................... 235/379; 194/DIG. 26; 194/2; 235/381

[58] Field of Search ............... 235/379, 380, 381, 383, 235/385; 221/287; 232/4 R; 109/22, 49, 53; 194/DIG. 9, DIG. 26, 2; 271/9, 315, 187, 162, 164; 209/534

[56] References Cited

U.S. PATENT DOCUMENTS

| | | | |
|---|---|---|---|
| 4,363,584 | 12/1982 | Kokubo | 414/33 |
| 4,365,700 | 12/1982 | Arimoto et al. | 194/DIG. 26 |
| 4,369,360 | 1/1983 | Tsuji | 235/379 |
| 4,398,088 | 8/1983 | Hirose et al. | 235/379 |

*Primary Examiner*—Gene Z. Rubinson
*Assistant Examiner*—Robert Lev
*Attorney, Agent, or Firm*—Fleit, Jacobson, Cohn & Price

[57] ABSTRACT

An automatic money receiving and disbursing machine has two dealing openings through one of which the notes are received in the machine or disbursed from the machine. A discriminating section is provided for discriminating the received notes or the disbursed notes. Discrimination made through the discriminating section is made in a high grade or in a low grade. Two accumulating sections are provided between two dealing openings on a delivery section. These accumulating sections are used to temporarily store the notes. A receiving and disbursing box is provided for receipt of a specific kind of note. A disbursing box and a reject box are also provided.

5 Claims, 12 Drawing Figures

(B)
8a
8b
8c
8d
8e
8f
8g
8h
8j
8k
8m

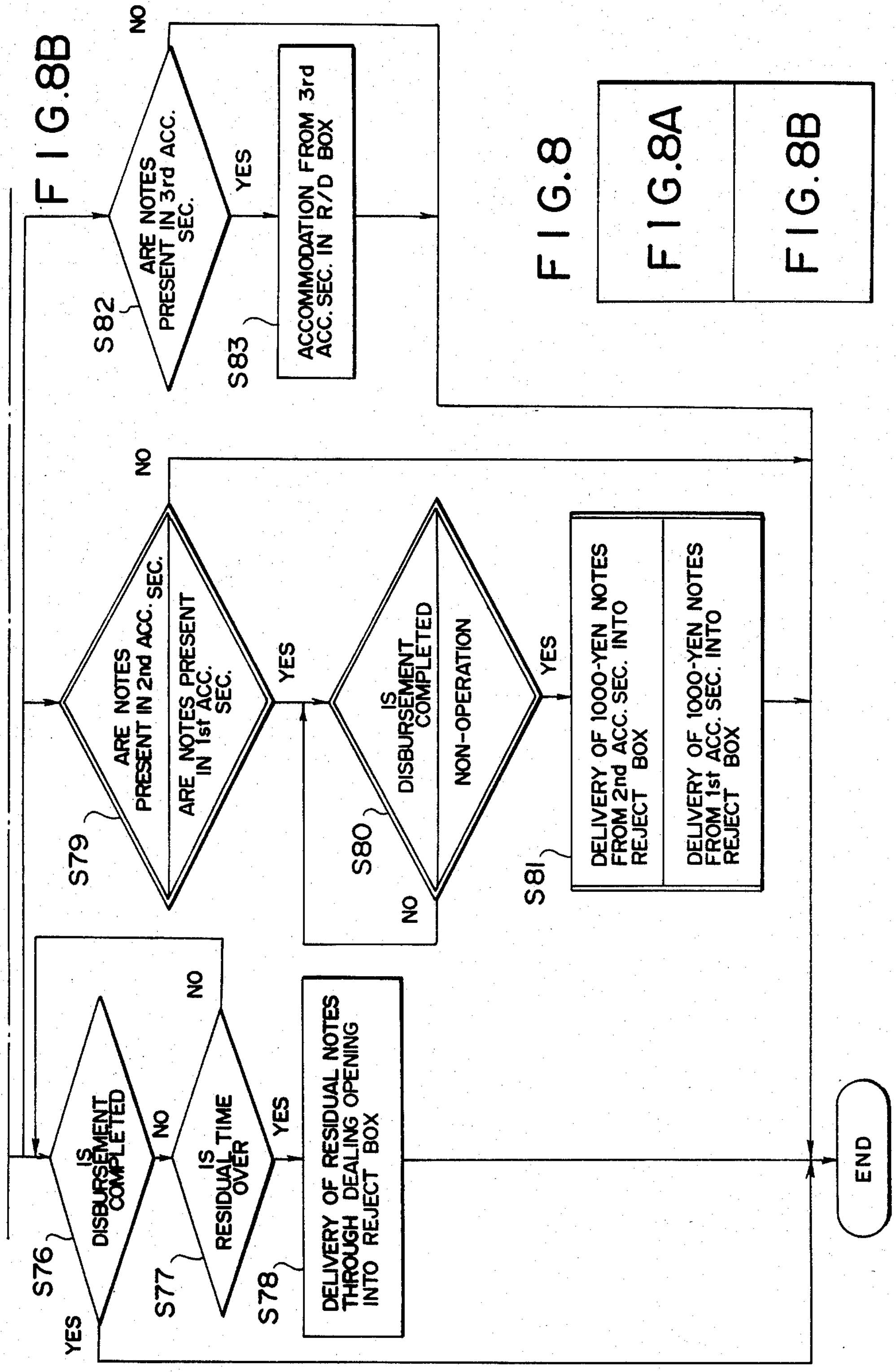
FIG.8B
S76
IS DISBURSEMENT COMPLETED
YES
NO
S77
IS RESIDUAL TIME OVER
NO
YES
S78
DELIVERY OF RESIDUAL NOTES THROUGH DEALING OPENING INTO REJECT BOX
S79
ARE NOTES PRESENT IN 2nd ACC. SEC.
ARE NOTES PRESENT IN 1st ACC. SEC.
NO
YES
S80
IS DISBURSEMENT COMPLETED
NON-OPERATION
NO
YES
S81
DELIVERY OF 1000-YEN NOTES FROM 2nd ACC. SEC. INTO REJECT BOX
DELIVERY OF 1000-YEN NOTES FROM 1st ACC. SEC. INTO REJECT BOX
S82
ARE NOTES PRESENT IN 3rd ACC. SEC.
NO
YES
S83
ACCOMMODATION FROM 3rd ACC. SEC. IN R/D BOX
END
FIG.8
FIG.8A
FIG.8B

AUTOMATIC MONEY RECEIVING AND DISBURSING MACHINE

BACKGROUND OF THE INVENTION

The present invention relates to an automatic money receiving and disbursing machine for receiving and disbursing notes.

The conventional automatic money receiving and disbursing machine has a receiving function and a disbursing function. That is, the automatic money receiving and disbursing machine is required to have a receiving function of detecting one by one received notes inserted in the receiving section, receiving notes judged as being true notes and returning notes judged as being not true notes, and a disbursing function of temporarily storing disbursed notes fed out from the disbursing box in the machine while detecting disorder such as double feeding or incorporation of a different kind of note, discharging the stored notes when a predetermined number of notes are stored without detection of disorder, and directing the stored notes and abnormal notes to a reject box when they are disordered, and directing the stored notes and abnormal notes to a reject box when disorder is detected before a predetermined number of notes are stored and repeating the disbursing operation from the beginning.

In the conventional automatic money receiving and disbursing machine, an arrangement for performing the receiving function and an arrangement for performing the disbursing function should be separated completely from each other so as to prevent mingling of notes. Accordingly, it may be considered that receiving and disbursing machines performing both the functions, respectively, are independently constructed and then integrated. However, if the receiving machine and disbursing machine are simply integrated, the size of the resulting automatic money receiving and disbursing machine is increased and the structure becomes complicated.

In order to solve this problem, it is deemed necessary to generally solve the following technical problems (no special order):

(1) Is it necessary to dispose a discriminating section for checking received notes and a discriminating section for checking disbursed notes independently?

(2) Is it necessary to temporarily pool notes every time, when received or disbursed notes are checked and counted? Is it permissible to use one pool section for both the received and disbursed notes or to use as the pool section a part or all of a reject box for excluding abnormal notes or a receiving box for receiving received notes?

(3) When disorder such as double feeding or slant feeding is checked in notes to be disbursed, is it necessary to perform checking again, and if this checking is necessary, how is this checking accomplished?

(4) When disorder is detected in received notes, if the disorder is due to soiling, adhesion of tape or the like or partial breakage, should a bank receive such abnormal notes. In such circumstances, is it permissible to perform the returning operation after checking is conducted only once?

(5) When received notes are judged as being normal, how can some notes less broken or soiled notes be used again as notes to be disbursed?

(6) When discriminating zones are disposed for checking received notes and disbursed notes, respectively, since discrimination of the kind should already be done in the disbursed notes, is it sufficient if only checking of a delivery error such as double feeding or slant feeding (low-grade discrimination) is done?

(7) When received notes are judged as being normal by high-grade discrimination and it becomes necessary to check these notes again so as to assort them according to the face value, is it necessary to perform high-grade discrimination again?

(8) When some of received notes admitted to the receipt are used again as notes to be disbursed, how should normal notes, abnormal notes and assorted notes be dealt with?

(9) When the front and back are checked in a certain kind of note, is there any means for inverting the reverse notes?

(10) In the case where a certain kind of notes judged as being usable again are passed through the discriminating section, is it possible to prolong the life of the discriminating section by keeping the discriminating section in the non-opening state?

(11) In the case where notes admitted to the receipt are used again, what operation should be done if a disbursing box for the corresponding kind of notes is full?

(12) If it is possible to check both the received and disbursed notes in the same discriminating section, should high-grade discrimination be done for checking the disbursed notes. Is there any simple means for checking the disbursed notes?

(13) When disorder is observed in a specific kind of disbursed notes, this disorder is frequently due to a delivery error such as double feeding. If doubly fed notes and the like are excluded as abnormal notes, the efficiency is reduced. Is there any means for preventing this reduction of the efficiency?

(14) Supposing that it is possible to use again all the kinds or specific kinds of notes, how should connection to or disconnection from a common route for both the received and disbursed notes be done?

(15) When received notes are checked twice, it is necessary to temporarily pool normal notes and abnormal notes independently, and according to instructions of a customer, it is necessary to return abnormal notes alone or all the notes. How should these treatments be done?

(16) In the case where two dealing openings and received notes admitted to the receipt are used again, how should abnormal and normal notes be temporarily pooled?

(17) In the case where there are two dealing openings and normal notes are delivered to the appointed dealing opening, where should the normal notes and abnormal notes be pooled for performing the operation assuredly?

SUMMARY OF THE INVENTION

The present invention has been completed under such background. The present invention is characterized in that when first discrimination is carried out, the main discriminating function of the discriminating section is exerted and when notes admitted to the receipt or disbursed notes are discriminated, a part of the main discriminating function of the discriminating zone is exerted, so that when high-grade discrimination is unnecessay, the portion which is likely to wear away promptly is allowed to rest whereby the size of automatic money receiving and disbursing machines can be disminished, the life of the machine can be prolonged and the operation capacity and efficiency of the machine can be improved.

In accordance with the present invention, there is provided an automatic money receiving and disbursing machine in which notes received in at least one dealing opening are fed to a discriminating section, the presence or absence of disorder regarding the notes is detected within the discriminating section and normal notes are received in the machine in accordance with the results of detection, comprising a delivery section for commonly delivering received notes, said discriminating section being actuated cooperatively with the delivery section to effect high grade discrimination to the received notes and to effect low grade discrimination to the notes admitted to the receipt.

As another aspect of the present invention, there is also provided on automatic money receiving and disbursing machine in which notes received in at least one dealing opening are fed in a discriminating section, the presence or absence of disorder regarding the notes is detected within the discriminating section and normal notes are received in the machine in accordance with the results of detection, which comprises a first accumulating section for temporarily storing the normal notes discriminated through the discriminating section and a second accumulating section for temporarily storing the abnormal notes twice discriminated through the discriminating section, the normal notes being accommodated in the machine or returned after the abnormal notes stored in the second accumulating section are returned to the dealing opening.

As a still another aspect of the present invention, there is also provided an automatic money receiving and disbursing machine in which notes received in at least one dealing opening are fed to a discriminating section, the presence or absence of disorder regarding the notes is detected within the discriminating section and normal notes are received in the machine, which comprises a delivery section connected to the first and second dealing openings for circulating the received money therein, two accumulating sections on the delivery section between the first and second dealing openings, one of the accumulating sections temporarily storing the normal notes and the other accumulating section temporarily storing the abnormal notes, respectively, and the abnormal notes twice discriminated through the discriminating section being returned through one of the dealing openings through which the notes are received.

As a still another aspect of the present invention, there is also provided an automatic money receiving and disbursing machine in which notes received in at least one dealing opening are fed in a discriminating section, the presence or absence of disorder regarding the notes is detected within the discriminating section and normal notes are received in the machine. A delivery section for commonly delivering the receiving notes and the disbursing being actuated cooperating with the delivery section to high grade discrimination the received notes and to effect low grade discrimination to the disbursing notes.

DESCRIPTION OF THE DRAWINGS

The present invention will not be described in detail by reference to an embodiment illustrated in the accompanying drawings in which.

DESCRIPTION OF THE PREFERRED EMBODIMENTS

One embodiment of the present invention will be now described in detail with reference to the accompanying drawing.

Figure 1:
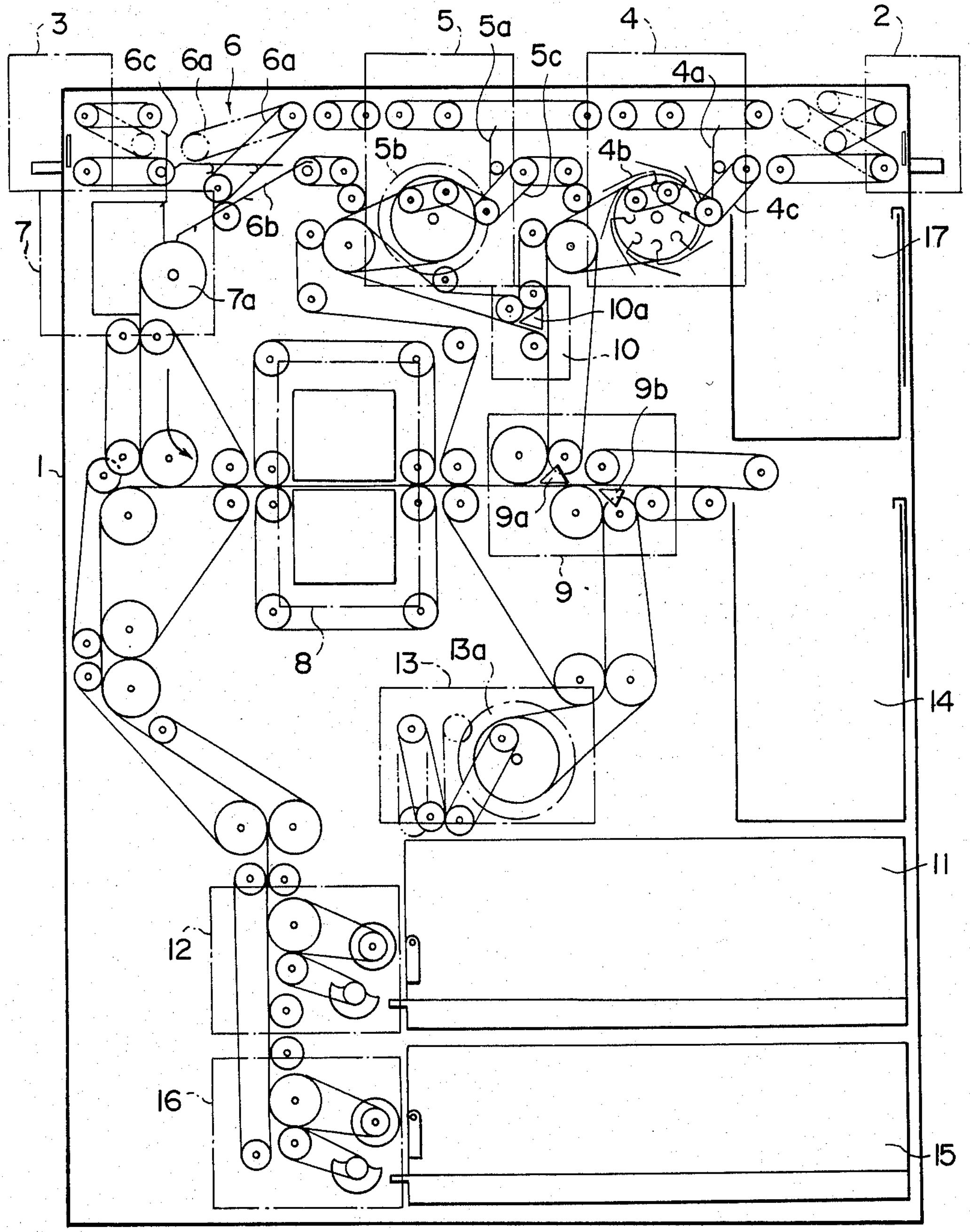
FIG. 1 is a side view showing the structure of one embodiment of the automatic money receiving and disbursing machine according to the present invention.
Figure 2:
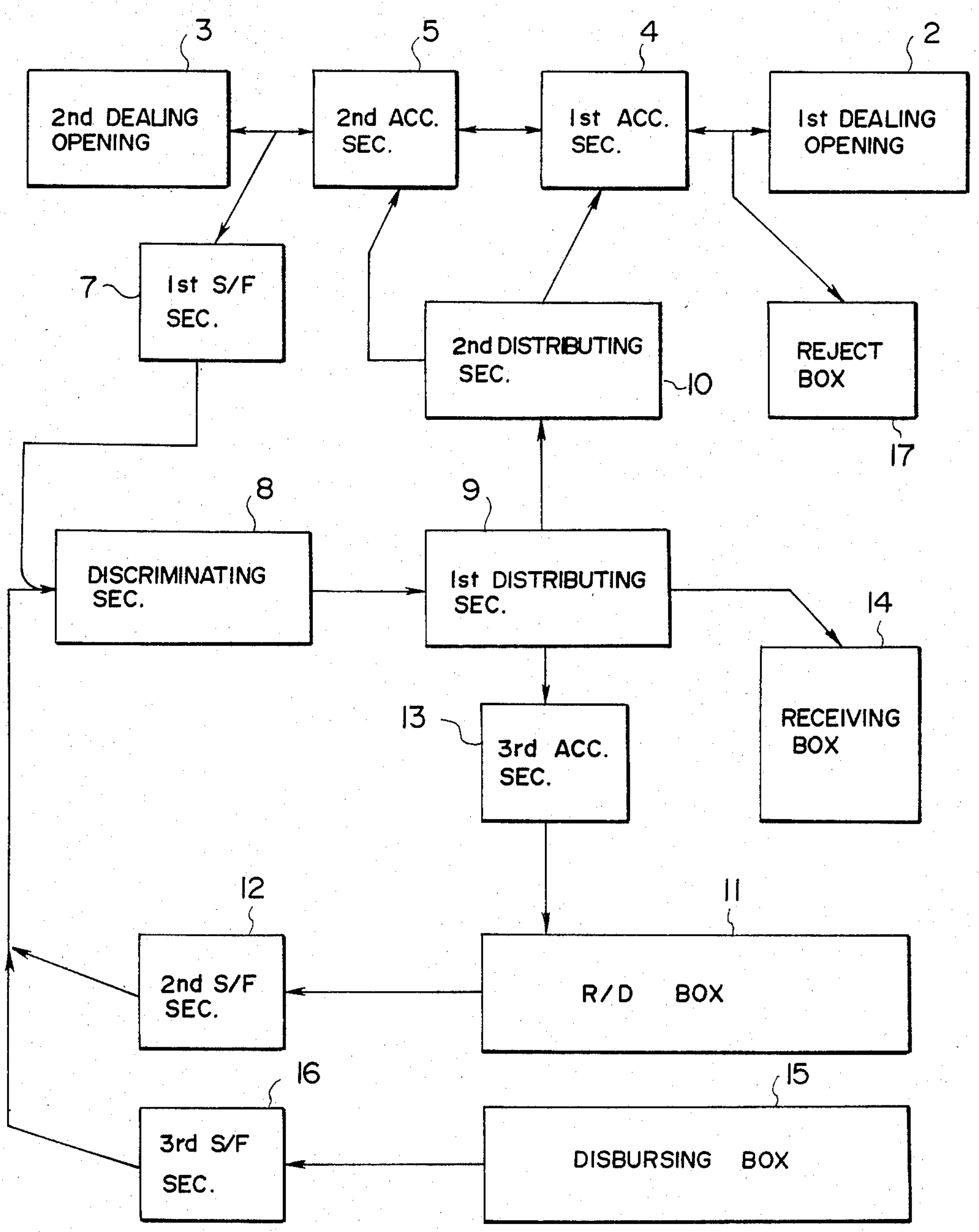
FIG. 2 is a block disgram showing the flow of notes travelling through the structural elements in FIG. 1.

FIG. 1 is a side view illustrating the structure of an embodiment of the automatic money receiving and disbursing machine to which the present invention is applied. FIG. 2 is a block diagram illustrating the flow of notes among structural elements shown in FIG. 1. The above-mentioned problem of the conventional automatic money receiving and disbursing machine and the technical problems (1) through (17) are substantially solved by this structure of the present invention, as described hereinafter.

In the automatic money receiving and disbursing machine according to this embodiment, first and second dealing openings 2 and 3 are formed on both the sides of a machine body 1, and the machine is constructed so that notes received and notes disbursed are charged and disbursed through these dealing openings, respectively.

The receiving treatment (receiving function) and the disbursing treatment (disbursing function) will now be described independently with reference to flow charts of FIGS. 6 through 8.

[Deposit Treatment]

Figure 6B:
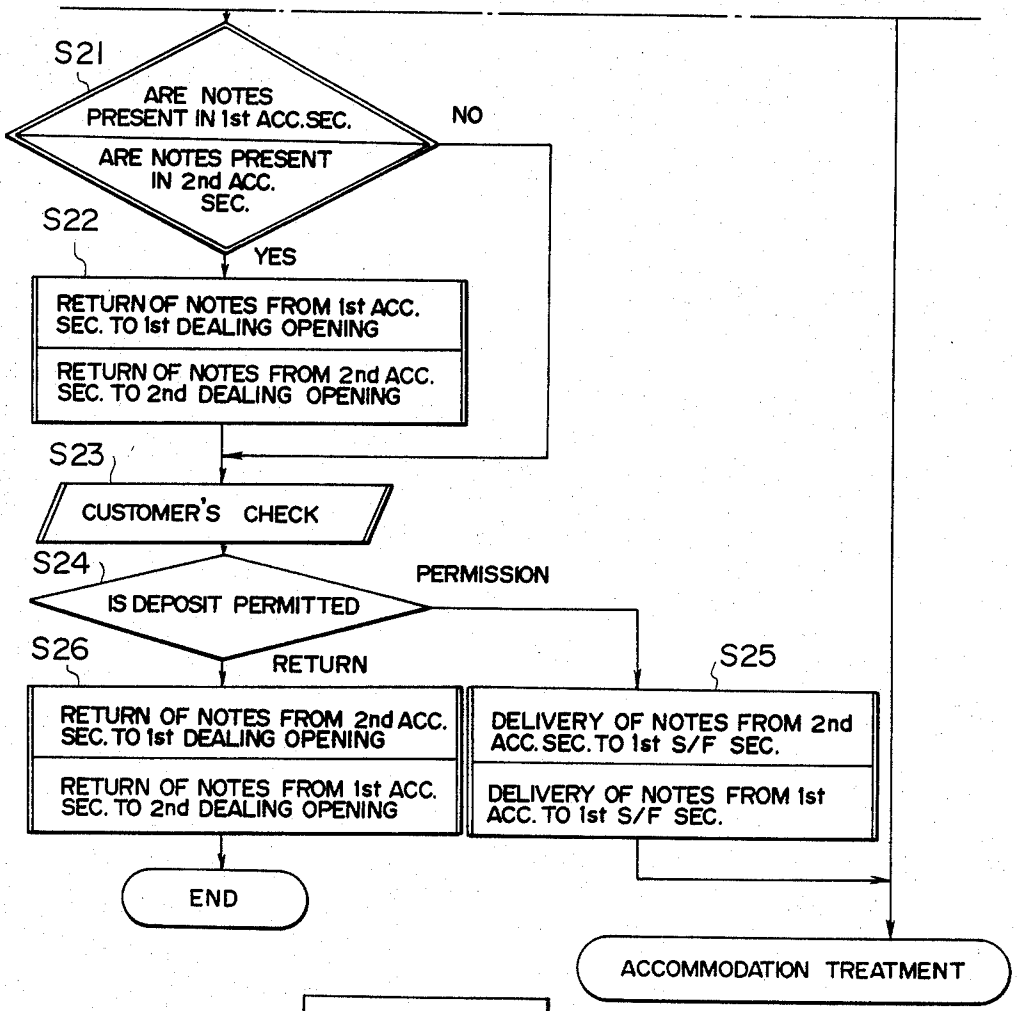
Figure 6:
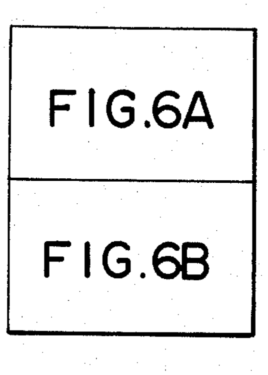
Figure 6A:
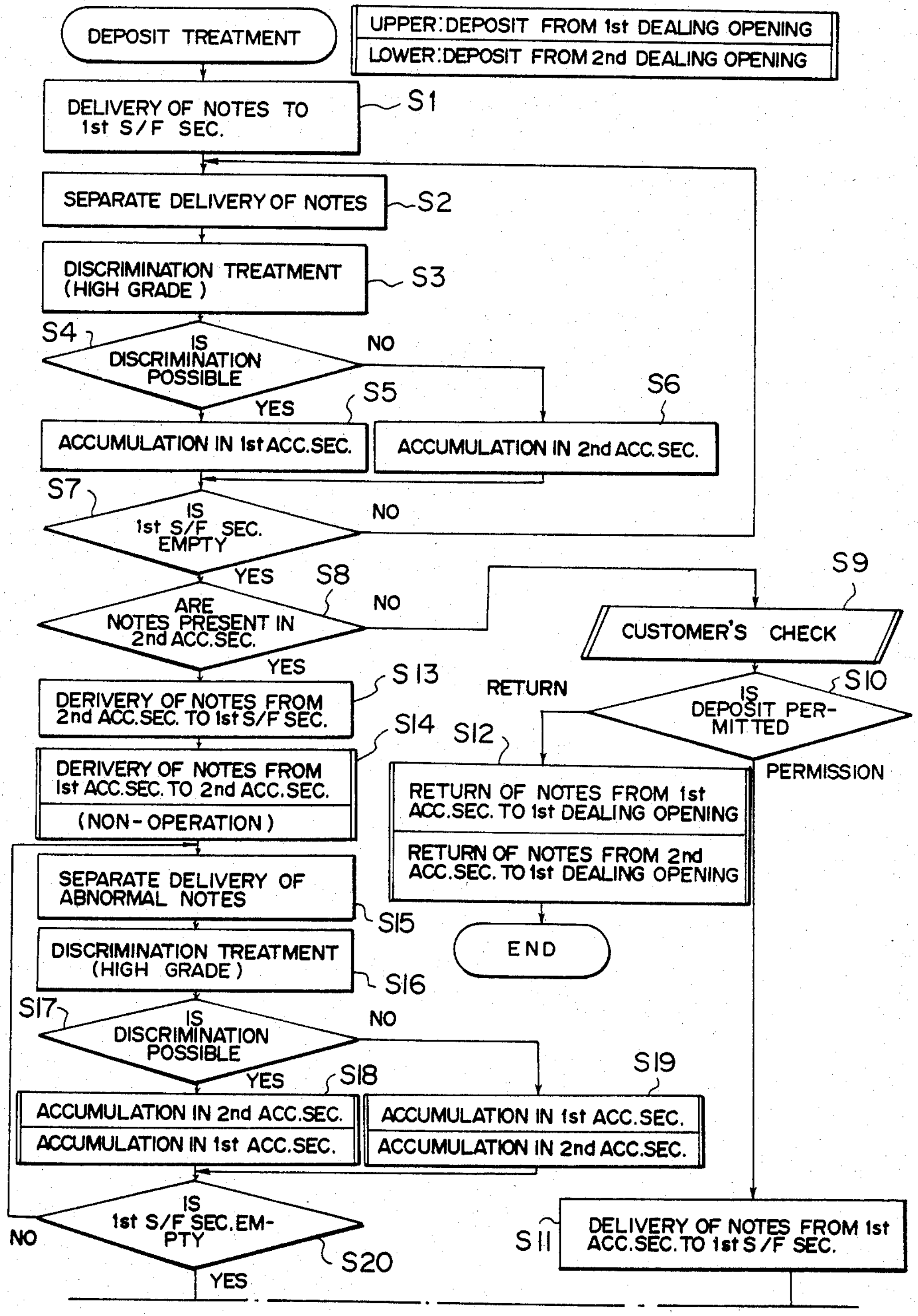
Figure 7B:
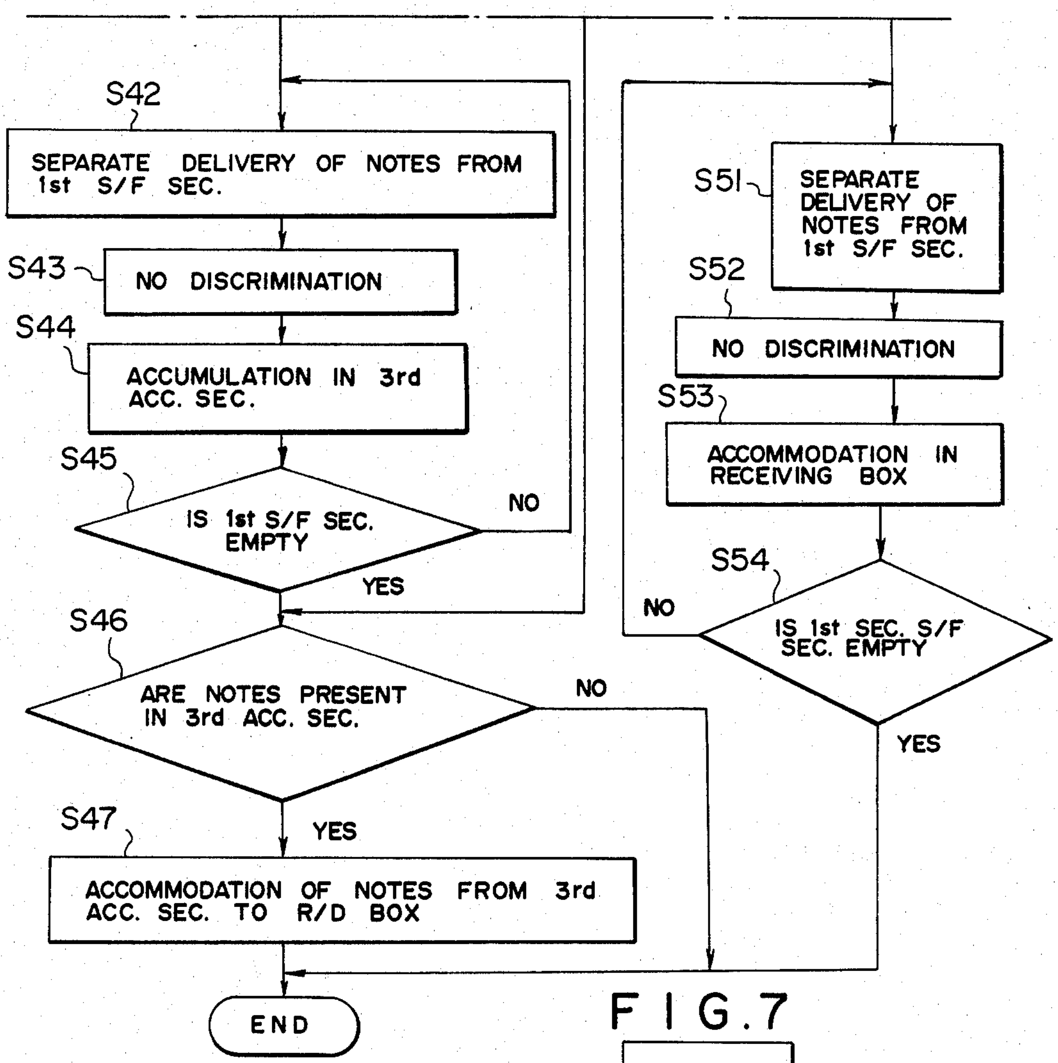
Figure 7:
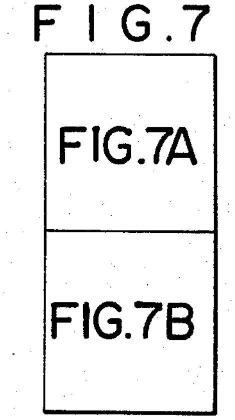
Figure 7A:
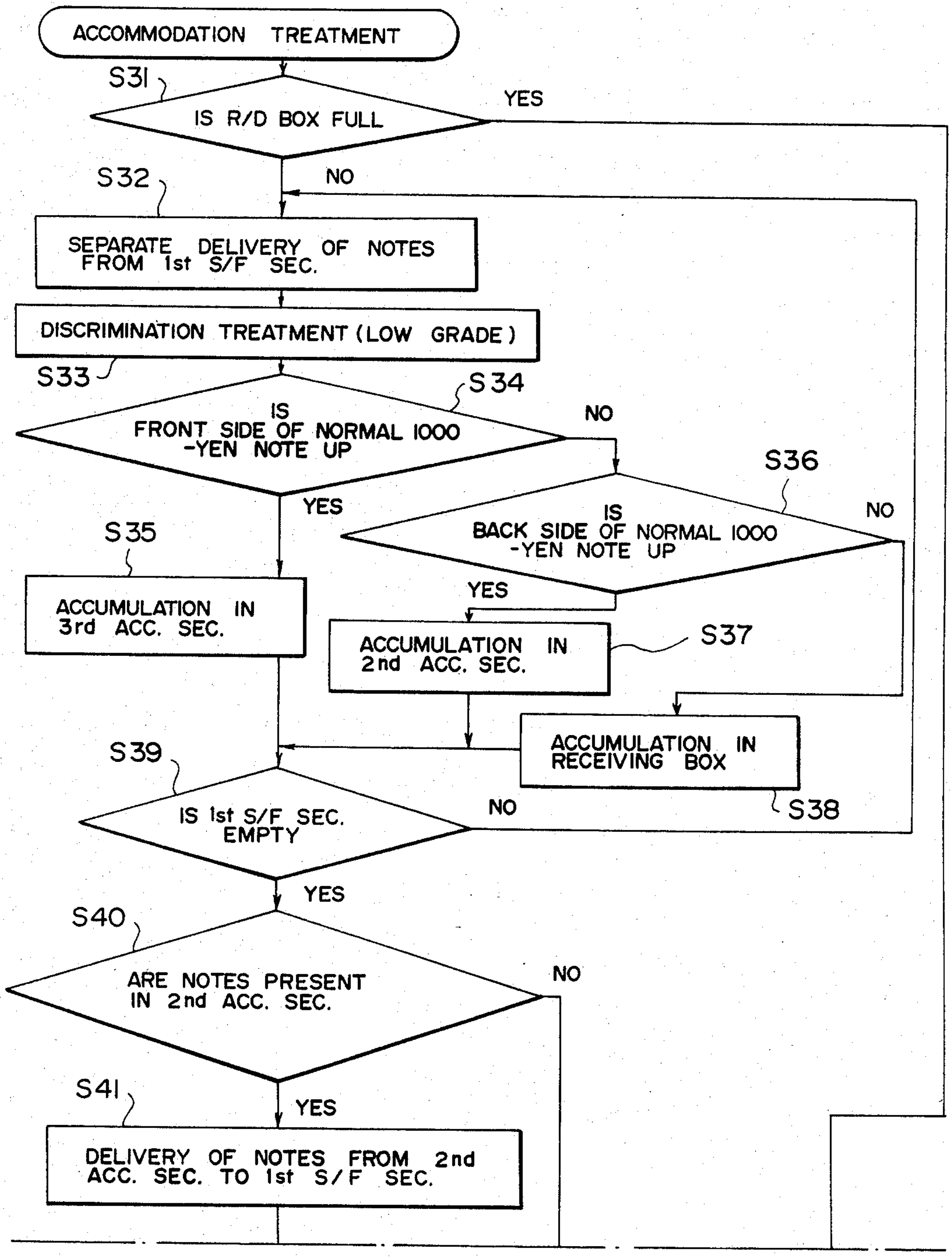

When a customer throws notes into the machine to the first or second dealing opening 2 or 3, the treatment is carried out along the flow shown in FIGS. 6 and 7.

Step 1

Notes thrown from the first dealing opening 2 are passed through a first accumulating section 4 and a second accumulating section 5 by a group of delivery belts (at this step, gathering plates **4*a* and 5*a* of the first and second accumulating sections 4 and 5 are maintained at the horizontal posture to allow passage of notes), and they are delivered to a first separating and feeding section 7 through a temporary pool section 6. Notes thrown through the second dealing opening 3 are delivered to the vicinity of the second accumulating section 5 by turning upward a belt 6*a* of the temporary pool section 6 as indicated by chain lines in FIG. 1, and the belt 6*a* and guide plate 6*b* are returned to the original position indicated by solid lines in FIG. 1 to delivery the notes to the first separating and feeding section 7**.

Step 2

In the case where notes are piled in the first separating and feeding section 7, notes are separated one by one by the difference between the friction coefficient in the notes and the friction coefficient of a friction roller 7*a*, and the notes are fed in the direction of arrow A in FIG. 1 to a discriminating section 8.

Step 3

This discriminating section 8 is disposed to check the delivered notes one by one, and it has the following discriminating functions.

Figure 5:
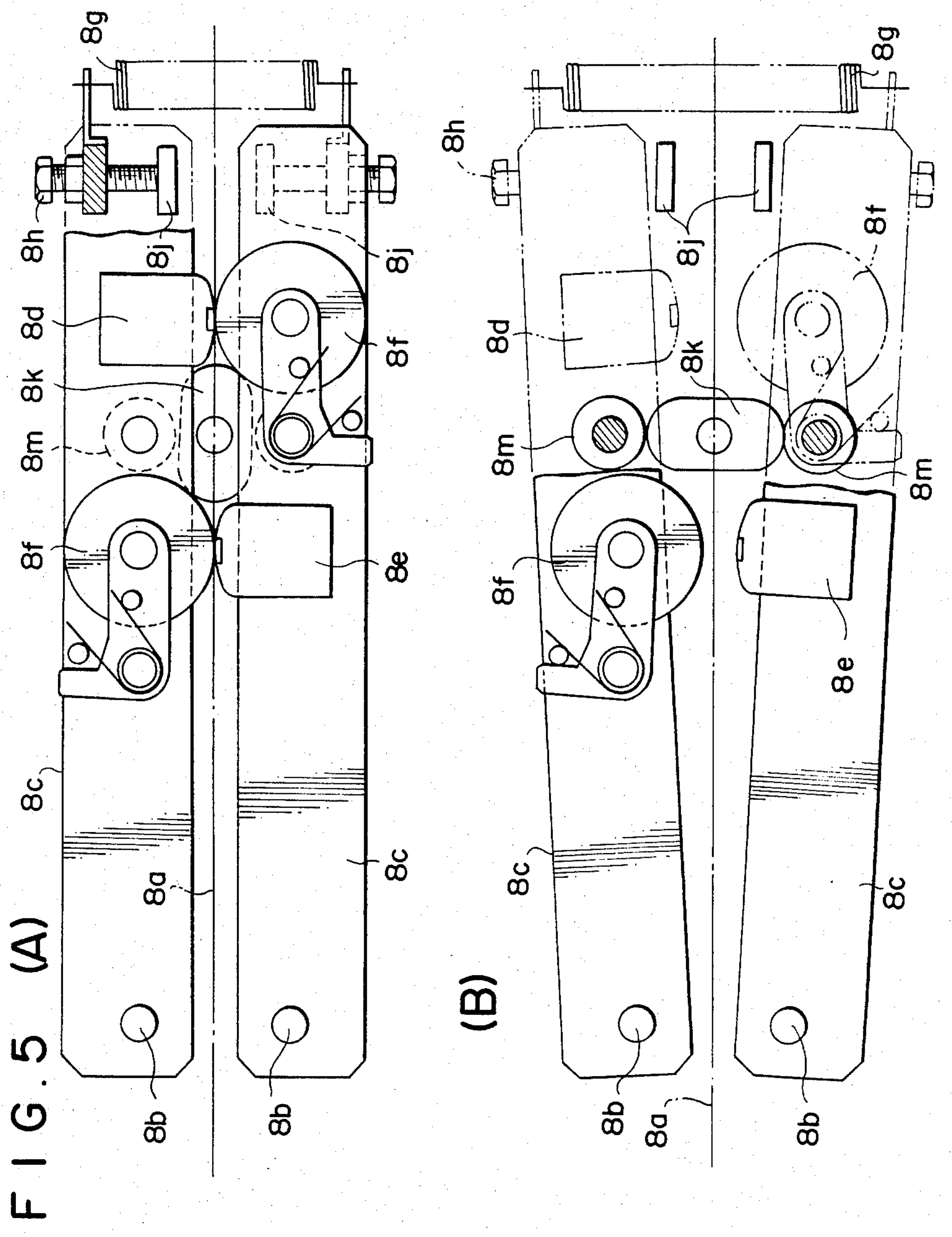

(a) Discrimination of a photo-pattern by utilizing transmitted rays.
(b) Discrimination of a photo-pattern by utilizing reflected rays.
(c) Discrimination of a magnetic pattern by using a magnetic head shown in FIG. 5.
(d) Detection of double feeding by utilizing transmitted rays.
(e) Detection of double feeding by detecting the thickness by mechanical means.
(f) Detection of the note length by utilizing signals generated by intermission of rays.
(g) Detection of slant feeding by utilizing signals generated by intermission of rays.
(h) Detection of proximate feeding (abnormal approach of successively fed notes) by utilizing signals generated by intermission of rays.

In this embodiment, the discrimination exerting all of the foregoing discriminating functions is called "the high-grade discrimination", and the discrimination exerting the functions (b) and (d) through (h) is called "the low-grade discrimination".

Of these discriminating functions, the function (c) detects a minute difference in the character of the note, and means for this function is considered to have a shorter life than those of other functioning means. Therefore, in this embodiment, the means for the function (c), which is likely to wear away quickly on checking of notes, is not operated at the time of the low-grade discrimination. The means for discriminating a magnetic pattern has a structure shown in FIGS. 5A and 5B. Incidentally, in case of the above-mentioned (a) discrimination, the front and back sides of a note cannot be detected. Namely, this means is arranged so that it is not operated at the time of the low-grade discrimination.

More specifically, on both the sides of a delivery line 8*a* of the discrimination section 8, arms 8*c* are attached to the machine body 1 for rotation about a turning pin 8*b*, and magnetic head 8*d* and 8*e* are attached to the arms 8*c*, respectively. Contact rollers 8*f* are attached at the positions confronting the magnetic heads 8*d* and 8*e* to bring notes fed along the delivery line 8*a* into contact with the magnetic head 8*d* and 8*e*. Both the arms 8*c* are urged in the direction approaching each other by a spring 8*g*, and the positional relationship of the magnetic head 8*d* and 8*e* to the delivery line 8*a* is adjusted by bolts 8*h* and securing frames 8*j* integrated with the machine body 1. When a cam piece 8*k* is turned by an external driving source according to need, the magnetic head 8*d* and 8*e* attached to the arms 8*c* and both the contact rollers 8*f* are separated from the delivery line 8*a* as shown in FIG. 5B, notes are passed through the discriminating section 8 without any detecting function being exerted. By adoption of this arrangement, the above-mentioned technical problem (10) can be solved.

Step 4

Received notes are subjected to the high-grade discrimination in the discriminating section, and if the discrimination of the note kind or the like is possible (normal notes), the notes are delivered to the step 5 and if the discrimination is impossible (abnormal notes), the notes are delivered to the step 6. More specifically, a distributing fork 9*a* of a first distributing section 9 is changed over to distribute and deliver notes into the first or second accumulating section 4 or 5 through a fork 10*a* of a second distributing section 10.

Step 5

Normal received notes are fed between vanes of an accumulating wheel 4*b* of the first accumulating section 4, and when the gathering plate 4*a* is in the erected state as shown in FIG. 1, the notes are accumulated on the accumulating wheel 4*b*.

Step 6

Notes judged as being abnormal among the received notes are accumulated by an accumulating wheel 5*b* of the second accumulating section 5.

Step 7

When the presence or absence of notes is detected in the first separating and feeding section 7 and it is detected that notes are left, the operations of the steps 2 through 7 are repeated, and if all the notes are delivered out (the first separating and feeding section 7 becomes empty) and the operations of the steps 2 through 6 are completed, the operation of the step 8 is initiated.

Step 8

It is checked whether or not there are present notes in the second accumulating section 5, that is, whether or not the received notes include abnormal notes, and if all of the received notes are normal, the ôperation of the step 9 is performed. If the presence of abnormal notes is confirmed, the operation of the step 13 is automatically performed.

Step 9

The cüstomer checks the amount of money (in the discriminating section 8, addition is effected every time one note is checked, though the explanation is omitted, and the sum is displayed in the vicinity of the first or second dealing opening 2 or 3).

Step 10

The customer checks the total amount of money displayed and depresses a depositing button or the like to give a permission of receipt of money.

Step 11

The notes accumulated in the first accumulating section 4 are fed to the first separating and feeding section 7, and the accommodation treatment is then carried out along the flow shown in FIG. 7.

Step 12

At the step 10, if the customer desires return of the notes and depresses a return button or the like, in the case where the notes have been charged from the first dealing opening 2, the gathering plate 4*a* and belt 4*c* of the first accumulating section 4 are made horizontal and the notes are returned to the first dealing opening 2. In the case where the notes have been charged from the second dealing opening 3, the gathering plate 5*a* and belt 5*c* of the second accumulating section 5 are made horizontal and also the belt 6*a*, guide plate 6*b* and guide plate 6*c* of the temporary pool section 6 are maded horizontal, and the notes are returned to the second dealing opening 3.

Step 13

In the case where there are left abnormal notes in the second accumulating section 5 at the step 8, checking is conducted again by a detection signal indicating the presence of abnormal notes in the received notes, which is emitted from the discriminating section 8. The abnormal notes accumulating in the second accumulating section 5 are in the reversed state and checked again in this state. For example, when they are charged with the "front" side being as the top, they are checked again with the "back" side being as the top. As described hereinbefore with reference to the steps 1 and 2, the notes are delivered to the first separating and feeding section 7 through the temporary pool section 6.

Step 14

Subsequently to the operation of delivering the abnormal notes accumulated in the second accumulating section 5 to the first separating and feeding section 7, the normal notes accumulated in the first accumulating section 4 are delivered to the second accumulating section 5 and temporarily pooled therein in the case where these notes have been charged from the first dealing opening 2. In the case where thses notes have been charged from the second dealing opening 4, they are successively pooled in the first accumulating section 4.

Step 15

The abnormal notes kept in the reversed notes are separated one by one again and delivered to the discriminating section 8.

Step 16

The high-grade discrimination is conducted again through the discriminating functions (a) through (h).

Step 17

The notes are assorted by the distributing fork 10*a* of the second distributing section 10 through the first distributing section 9 based on the results of the discrimination.

Step 18

If the discrimination is possible, that is, if notes are judged as being normal by re-checking, in the case where the notes have been charged from the first dealing opening 2, these notes are accumulating in the second accumulating section 5. In the case where the notes have been charged from the second dealing opening 3, these notes judged as being normal are accumulating in the first accumulating section 4.

Step 19

If the discrimination is impossible, that is, if notes are judged as being abnormal by re-checking, in the case where the notes have been charged from the first dealing opening 2, the notes are accumulated in the first accumulating section 4. In the case where the notes have been charged from the second dealing opening 3, the notes are accumulated in the second accumulating zone 5.

Step 20

When the first separating and feeding section 7 becomes empty and the operations of the steps 15 through 19 are completed, the operation of the step 21 is performed.

Step 21

If as the result of re-checking of the reversed notes, it is confirmed that there are present notes judged as being abnormal, that is, if notes are accumulated in the first accumulating section 4 (see S1) in the case where the notes have been charged from the first dealing opening 2 or notes are accumulated in the second accumulating section 5 in the case where the notes have been charged from the second dealing opening 3, the operation of the step 22 is performed. If accumulation of the notes is not detected, the operation of the step 23 is performed.

Step 22

In the case where the notes have been charged from the first dealing opening 2, the abnormal notes are returned from the first accumulating section 4, and in the case where the notes have been charged from the second dealing opening 3, the abnormal notes are returned from the second accumulating section 5.

Step 23

The amount of the notes returned to the customer and the amount of the notes judged as being normal in the discriminating section 8 by the high-grade discrimination are confirmed.

Step 24

Only the notes judged as being normal are received, or also the notes judged as being normal are returned.

Step 25

When permission for the receipt is given by depressing the depositing button, the normal notes accumulated in the second accumulating section 5 or the first accumulating section 4 are delivered to the first separating and feeding section 7 (the third delivery to the section 7) through the temporary pool section 6, and the accommodation treatment is carried out along the line shown in FIG. 7.

Step 26

If return instructions are given by the customer by depressing the return button, the normal notes accumulated in the second accumulating section 5 are returned to the first dealing opening 2, or the normal notes accumulated in the first accumulating section are returned to the second dealing opening 3.

The above-mentioned technical problems (4), (15) and (16) are completely or partially solved by treating notes through the foregoing steps 1 through 26.

[Accommodation Treatment]

All the notes received in the machine body 1 pursuant to instructions of the customer are normal. Then, the treatment for separating the notes according to the kinds or selecting a specific kind of notes (1000-yen notes in FIG. 7) and using them again is carried out.

Step 31

Figure 3:
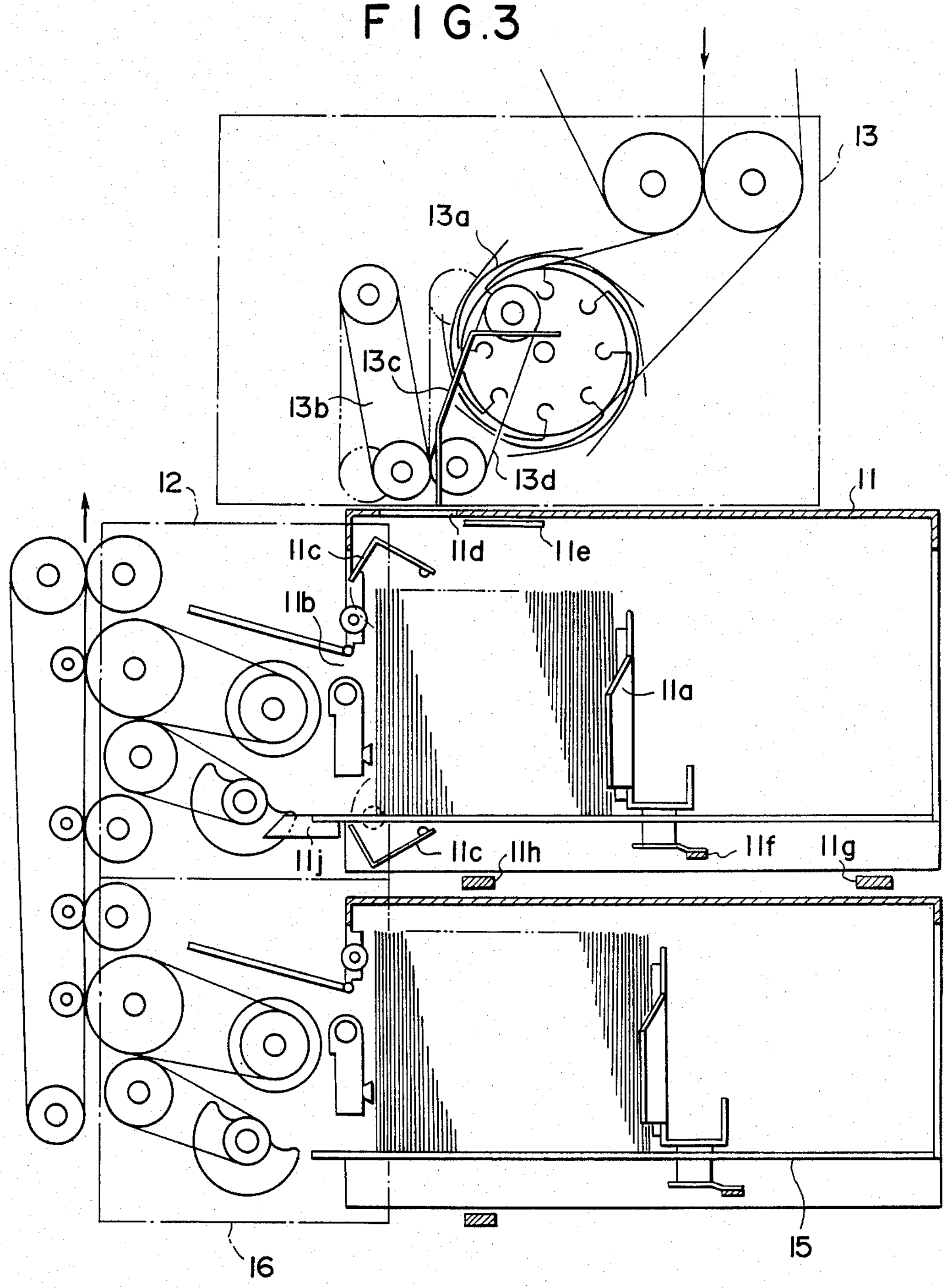
FIG. 3 is a side view showing in detail the receiving and disbursing box, second separating and feeding section and third accumulating section shown in FIG. 1.
Figure 4:
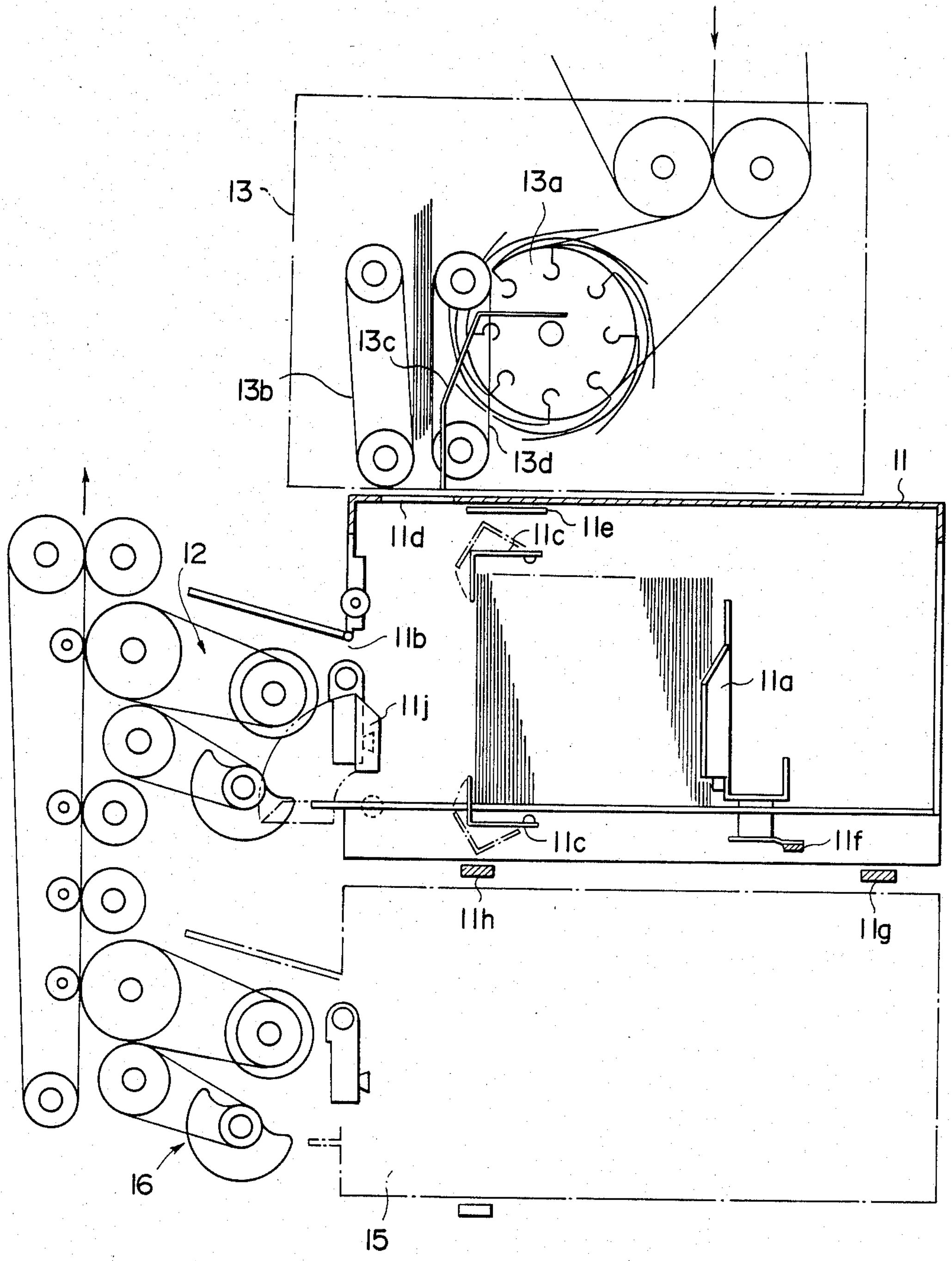
FIG. 4 is a side view, similar to FIG. 3, for showing the operation of the members in FIG. 3, FIGS. 5A and 5B are side views showing in detail the structure and operation of the discriminating section shown in FIG. 1, FIGS. 6 through 8 are flow charts showing the operations of the note receiving and disbursing machine.

When depositing instructions are given (the depositing button is depressed by the customer), it is detected whether or not a receiving and disbursing box 11 shown in FIGS. 1 and 3 is full of 10000-yen notes. As shown in FIG. 3, in this receiving and disbursing box 11, contained notes are pushed out from an outlet 11*b* toward a second separating and feeding section 12 by a movable gripping plate 11*a*, and when some of received notes are used again, a pressing member 11*c* is turned to press the outlet sides of the notes and move them toward the movable gripping plate 11*a* as shown in FIG. 4, whereby a note-containing space is formed between the movable gripping plate 11*a* and the outlet 11*b* and the notes are received from a falling opening 11*d* formed in the upper portion of the box 11 (a shutter 11*e* opening and closing this falling opening 11*d* is arranged so that only when the receiving and disbursing box 11 is attached to the machine body 1, the opening 11*d* is opened). An operating piece 11*f* such as a magnet is arranged integrally with the movable gripping plate 11*a* in the receiving and disbursing box 11, and a fullness detecting sensor 11*g* and a near end detecting sensor 11*h* are actuated by the operating piece 11*f* to detect the quantity of notes. As shown in FIGS. 3 and 4, a stopper 11*j* capable of moving in the vertical direction is arranged in the vicinity of the outlet 11*b* to guide the notes while preventing them from projecting from the outlet when the notes are let to fall down. When the notes are delivered out, the pressing member 11*c* and stopper 11*j* are retreated as shown in FIG. 3.

Step 32

In the case where the receiving and disbursing box 11 is not full at the preceding step 31, the notes admitted to the receipt (normal notes) at the step 11 or 25 are fed into the discriminating section 8 from the first separating and feeding section 7.

Step 33

The discriminating section 8 is changed over to the low-grade discrimination (second class in FIG. 7) designated mainly for discrimination of the kinds of notes.

Step 34

Of the notes admitted to the receipt, normal 10,000-yen notes with the "front side" being up are detected. In case of "YES", the operation of the step 35 is performed, and in case of "NO", the operation of the step 36 is performed. By the term "normal 10,000-yen note" used herein means a 10,000-yen notes in which soiling, adhesion of tape or partial breakage is not observed and which is suitable for re-use. Other note is called "broken note" and this broken note is not used again.

Step 35

Normal 10,000-yen notes with the "front side" being up are fed from the discriminating section 8 to a third accumulating section 13 by the forks 9*a* and 9*b* of the first distributing section 9 and they are accumulated in the vertical posture between a belt 13*b* and a guide plate 13*c* by an accumulating wheel 13*a* as shown in FIG. 4 (which shows the state where in order to contain the notes in the receiving and disbursing box 11, the belt 13*d* is projected from the rear of the guide plate 13*c*).

Step 36

Of notes other than the 10,000-yen notes with the "front side" being up at the step 34, normal 10,000-yen notes with the "back side" being up are detected. In case of "YES", the operation of the step 37 is carried out, and in case of "NO", the operation of the step 38 is performed.

Step 37

Normal 10,000-yen notes with the "back side" being up are accumulated in the second accumulating section 5 from the discriminating section 8 through the first and second distributing sections 9 and 10.

Step 38

Notes other than normal 10,000-yen notes at the steps 34 and 36, that is, broken 10,000-yen notes, 5000-yen notes, 1000-yen notes and erroneously fed notes (notes that are not discriminated by double feeding or the like), are contained into a receiving box 14 from the discriminating section 8 by the distributing forks 9*a* and 9*b* of the first distributing section 9.

Step 39

Notes which have been discriminated one by one at the steps 32 through 39 are subjected to the treatment of the step 35, 37 or 38 according to the kind or the "front" or "back" condition. Then, it is detected whether or not the first separating and feeding section 7 is "empty". In case of "NO", the treatments of the steps 32 through 38 are repeated on the notes left on the section 7, and when it is confirmed that the section 7 is empty, the operation of the step 40 is performed.

Step 40

It is detected whether or not notes, the side of which is corrected to the "front" side from the "back" side, are present in the second accumulating section 5. In case of "NO", the operation of the step 46 is performed. In case of "YES", the operation of the step 41 is performed.

Step 41

The notes accumulated in the second accumulating section 5 are delivered to the first separating and feeding section 7.

Step 42

The notes are fed out one by one from the first separating and feeding section 7.

Step 43

The discriminating section 8 is rendered nonoperative and the notes are passed through the discriminating section 8 unconditionally and fed to the third accumulating section 13 through the first distributing section 9.

Step 44

In the foregoing manner, 10,000-yen notes are gradually accumulated in the third accumulating section 13 in the state where the front and back sides are properly arranged.

Step 45

The operations of the steps 42 through 44 are repeated until no note is present any longer in the separating and feeding section 7. When it is detected that the separating and feeding section 7 becomes "empty", the operation of the step 46 is performed.

Step 46

It is detected whether or not notes to be used again, that is, normal 10,000-yen notes with the "front side" being up, are present in the third accumulating section 13, and if any 10,000-yen note is stored in the third accumulating section (for example, in the case where notes charged from the first or second dealing opening 2 or 3 do not include a 10,000-yen note), all the receiving operations are completed. If there are present 10,000-yen notes in the third accumulating section 13, the operation of the step 47 if performed.

Step 47

The pressing member 11*c* and stopper 11*j* of the receiving and disbursing box 11 are turned into the state indicated by solid lines in FIG. 4 to separate the notes from the outlet and form a containing space. From the falling opening 11*d* opened by the opening operation of the shutter 11*e*, the 10,000-yen notes to be used again are contained into the receiving and disbursing box 11 by vertically turning the belts 13*b* and 13*d* of the third accumulating section 13 in the direction separating from the guide plate 13*c* as shown in FIG. 4. Then, the receiving and disbursing box 11 and third accumulating section 13 are returned to the original state as shown in FIG. 3. Incidentally, in the normal 10,000-yen notes contained in the receiving and disbursing box 11, the "front" side is located on the right side of FIGS. 1 through 4.

By treating the notes through the steps 31 to 47, the technical problems (5), (7), (8), (9), (10) and (15) are completely or partially solved.

Step 51

In the case where the fullness of the receiving and disbursing box 11 is detected at the step 31 shown in FIG. 7, notes admitted to the receipt, which are accumulated in the first separating and feeding section 7, are fed out one by one.

Step 52

As at the step 43, the notes are passed through the discriminating section 8 without performing checking.

Step 53

The notes are let to fall down into the receiving box 14 and contained therein by the distributing forks 9*a* and 9*b* of the first distributing section 9.

Step 54

In the case where notes admitted to the receipt are left in the first separating and feeding section 7, the operations of the steps 51 through 53 are repeated, and if all the notes admitted to the receipt have been fed out from the first separating and feeding section 7 or if there is no note present between the first separating and feeding section 7 and the receiving box 14, all the operations are completed.

At these steps 51 through 54, in the case where 10,000-yen notes to be used are contained in a sufficient quantity in the receiving and disbursing box 11, all the kinds of notes admitted to the receipt are contained without any particular separation thereof. Accordingly, the technical problem (11) is solved.

[Disbursement Treatment]

In the case where disbursement of notes from the first or second dealing opening 2 or 3, a disbursing button is depressed while confirming the amount or kind of notes to be disbursed, and according to this operation, disbursement (payment) is performed through the following steps. In this embodiment, the desired amount of money is paid by two kinds of notes, that is, 10,000-yen notes and 1000-yen notes.

Step 61

It is checked in the machine body 1 whether or not 1000-yen notes are contained in the desired kinds of notes or in the total amount of money to be disbursed. If 1000-yen notes should be disbursed, the operation of the step 62 is carried out, and if 1000-yen notes need not be disbursed, the operation of the step 68 is carried out.

Step 62

In the case where disbursement of 1000-yen note is instructed, 1000-yen notes contained in a disbursing box 15 are taken out one by one with the "back side" being out by a third separating and feeding section 16 and are fed into the discriminating section 8 be delivery belts.

Step 63

The 1000-yen notes with the "front side" being out are subjected to the low-grade discriminating in the discriminating section 8.

Step 64

In the case where the 1000-yen notes are less-damaged normal 1000-yen notes suitable for disbursement, the operation of the step 65 is performed, and in the case where the 1000-yen notes are considerably damaged 1000-yen notes not suitable for disbursement or doubly fed 1000-yen notes, the operation of the step 66 is performed.

Step 65

In the case where the dealing opening instructed by the customer is the first dealing opening 2, the normal 1000-yen notes are accumulated in the first accumulating section 4 through the first and second distributing sections 9 and 10, and in the case where the dealing opening instructed by the customer is the second dealing section 3, the normal 1000-yen notes are accumulating in the second accumulating section 5.

In the accumulating zones 4 and 5, 1000-yen notes are accumulated with the "front side" being out.

Step 66

The 1000-yen notes not suitable for disbursement are accumulated in the second accumulating section 5 when the first dealing opening 2 is used or in the first accumulating section 4 when the second dealing opening 3 is used.

Step 67

When a necessary number of normal 1000-yen notes are accumulated in succession on the first 1000-yen note through the steps 62 to 66, completion of counting of 1000-yen notes is confirmed, and the operation of the step 68 performed.

Step 68

It is checked whether or not 10,000-yen are included in the notes to be disbursed. If 10,000-yen notes need not be disbursed, the operation of the step 75 is performed.

Step 69

Step 69

If 10,000-yen notes should be disbursed, 10,000-yen notes are fed one by one from the receiving and disbursing box 11 into the discriminating section 8 by the second separating and feeding section 12.

Step 70

In the discriminating section 18, the 10,000-yen notes with the "front side" being out are subjected to the low-grade discrimination.

Step 71

In the case where the 10,000-yen notes are less damaged and suitable for disbursement, the operation of the step 72 is performed, and in the case where the 10,000-yen notes are not suitable for disbursement because of erroneous delivery such as double feeding, the operating of the step 73 is performed.

Step 72

The normal 10,000-yen notes are accumulated below the previously accumulated 1000-yen notes in the first or second accumulating section 4 or 5.

Step 73

The 10,000-yen notes not suitable for disbursement are accumulated in the third accumulating section 13 through the first distributing section 9.

Step 74

Counting of the number of normal 10,000-yen notes and accumulation thereof are confirmed (in case of "NO", the operation of the step 69 is conducted again).

Step 75

The 1000-yen notes are piled on the 10,000-yen notes from the first accumulating section 4, when the dealing opening instructed by the customer is the first dealing opening 2 or from the second accumulating section 5 when the dealing opening instructed is the second dealing opening 3. All the notes are delivered out with the "front side" being out.

Step 76

Receipt of all the disbursed notes by the customer is confirmed by a detecting sensor disposed in the vicinity of the dealing openings 2 and 3, and the transaction is completed. When the detecting sensor detects all or some of the notes, the operation of the step 77 is performed.

Step 77

A timer is started and if the notes are received by the customer within a certain time, the operation of the step 76 is conducted again and completion of the transaction is confirmed.

Step 78

When a certain time is passed without the notes being received by the customer, the notes left in the dealing opening are taken into the first or second accumulating section 4 or 5 and the belt in the vicinity of the first dealing opening 2 is vertically turned as indicated by chain lines in FIG. 1, and the left notes are excluded into the reject box 17. A record of the customer forgetting to receive the left notes is prepared and is used for a service datum informing the customer of nonreceipt from the bank. Then, completion of the transaction is confirmed. In the machine body 1, the treatment of the notes not suitable for disbursement, which are accumulated at the steps 66 and 73, is conducted in succession.

Step 79

It is checked whether or not the 1000-yen notes not suitable for disbursement are accumulated in the second or first accumulating section 5 or 4. In case of "NO", it is judged that there is not a 1000-yen note not suitable for disbursement. When there are accumulated 1000-yen notes not suitable for disbursement, the operation is performed appropriately according to the accumulating section.

Step 80

When disbursement is performed through the first dealing opening zone 2, completion of disbursement and exclusion of the left notes are confirmed (it is checked whether "YES" is confirmed at the step 76 or the operation of the step 78 is completed). In case of "NO", the completion is waited, and in case of "YES", the operation of the step 81 is performed. If disbursement is performed through the dealing opening 2, the operation of the step 80 is omitted.

Step 81

The 1000-yen notes not suitable for disbursement accumulated in the second or first accumulating section 5 or 4 are excluded into the reject box 17 by moving upward the belt in the vicinity of the first dealing opening 2 as indicated by chain lines in FIG. 1, and the disbursing treatment is completed.

Step 82

It is checked whether or not the 10,000-yen notes not suitable for disbursement are accumulated in the third accumulating section 13, and in case of "NO", the disbursing treatment is completed.

Step 83

In the case where the notes not suitable for disbursement are detected, they are returned to the receiving and disbursing box 11. This operation is performed because it is mainly due to erroneous delivery such as double feeding that notes (10,000-yen notes) once judged as being suitable for disbursement are judged as being not suitable for disbursemnet, and if these notes are delivered again, double feeding is often eliminated. The bank should receive 10,000-yen notes even if they are considerably damaged or soiled, unless they are forged notes. On the other hand, from the viewpoint of service, notes to be disbursed should be less wrinkled damaged or soiled. Accordingly, only 10,000-yen notes that can be used again are separated and contained in the receiving and disbursing section. Furthermore, in view of the utilization efficiency of funds, it is perferred that 10,000-yen notes having a large face amount be used again.

If the operations of the steps 76, 78, 79, 81, 82 and 83 are completed, the overall disbursing treatment is completed.

By performing the operations of the steps 61 through 83, the technical problems (3), (5), (6), (10), (12), (13), (14) and (17) are completely or partially solved.

Figure 8A:
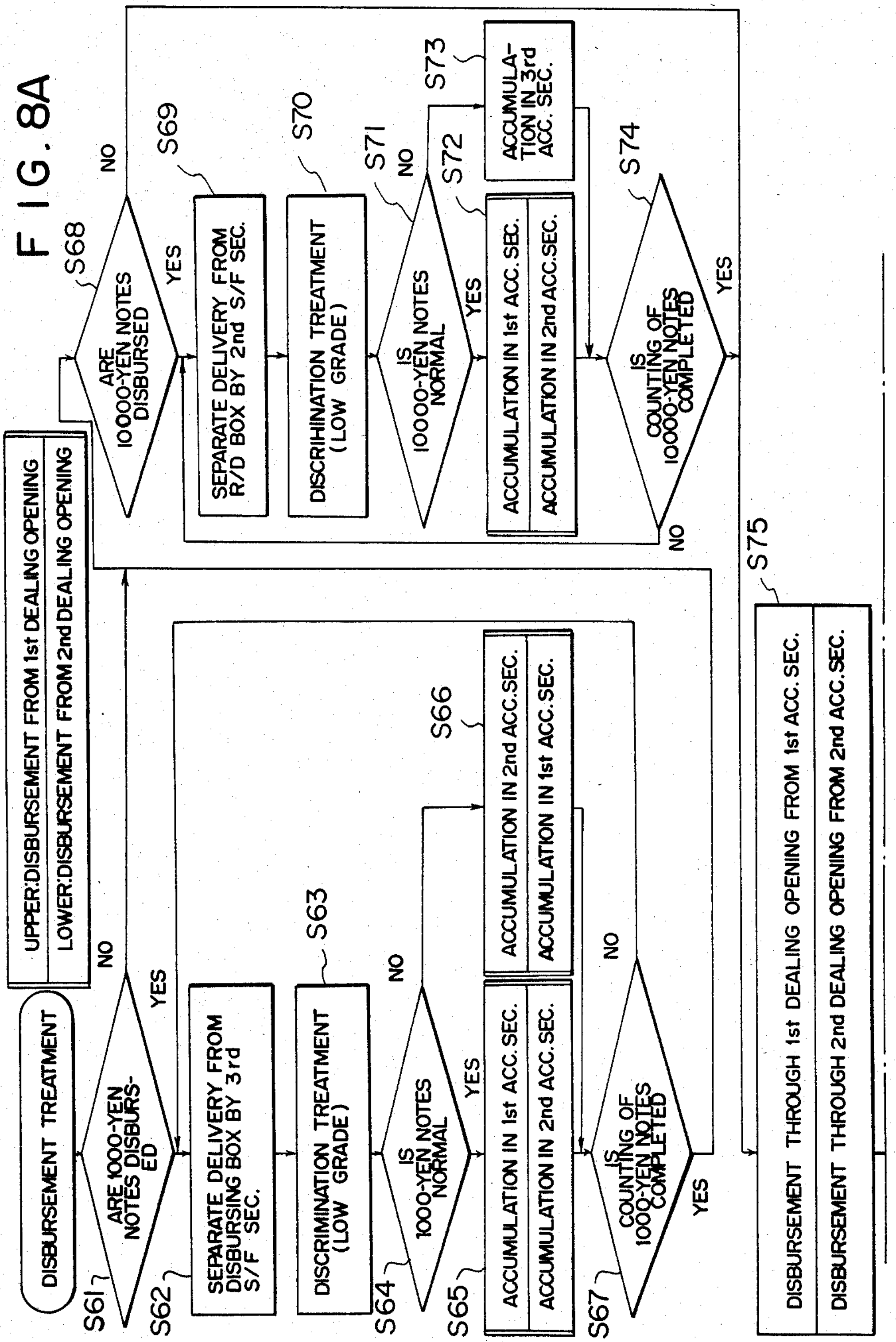

By the synergistic actions of the functions of the steps shown in FIGS. 6 through 8, all the above-mentioned technical problems (1) through (17) can be solved.

Incidentally, at the steps 71, 72 and 73, if a specific kind of notes to be used again (10,000-yen notes in the foregoing embodiment) or notes contained in advance in the receiving and disbursing box 11 are judged as being not suitable for disbursement because of erroneous delivery or the like by the low-grade discrimination at the disbursing treatment, they are accumulated in third accumulating section 16 in the foregoing embodiment. In the present invention, there may be adopted a method in which if notes contained in advance in the receiving and disbursing box 11 are judged as being not suitable for disbursement because of breakage or soiling by the low-grade discrimination at the disbursing treatment, these notes, like 1000-yen notes judged as being not suitable for disbursement, are accumulated in the second or first accumulating zone 5 or 4 from the discriminating section 8 and are then excluded into the reject box 17.

As will be apparent from the foregoing description, according to the present invention, in the case where notes admitted to the receipt are subjected to discrimination again for assorting or correction of the reversed position after high-grade discrimination has been conducted in the discriminating section, only parts of functions of the discriminating section are exerted to effect the low-grade discrimination. Since the low-grade discrimination is thus accomplished also by the discriminating section performing the high-grade discrimination, the size of the automatic money receiving and disbursing machine can be diminished, and since parts of the discriminating section that tend to wear away promptly are allowed to rest during the low-grade discrimination, the life of the discriminating section as a whole can be prolonged.

What is claimed is:

1. An automatic receiving and disbursing machine, said machine comprising:

at least one opening defined by the machine for movement of notes therethrough;

at least one accumulating means for accumulating the notes, said at least one accumulating means being in communication with said at least one opening;

a discriminating means for discriminating the notes received in said at least one accumulating means, said discriminating means selectively making one of a first discrimination wherein the notes are discriminated as to whether the notes are normal and a second discrimination wherein the notes are discriminated as to whether the notes are of a particular kind of note;

at least one receiving means for receiving the notes, the notes received by said at least one receiving means having been discriminated by the first discrimination of the discriminating means to be normal;

at least one distributing means for distributing the notes, the notes distributed by said at least one distributing means being distributed to said at least one accumulating means and to one of said at least one receiving means, the notes being distributed into said one of said receiving means being firstly distributed by said at least one distributing means to said at least one accumulating means after said first discrimination being effected by said discriminating means and then said second discrimination being effected to the notes having been discriminated by said first discrimination to be normal so as to select a particular kind of note to be distributed to said one receiving means.

2. A machine as set forth in claim 1, further comprising a disbursing box for storing therein the notes to be disbursed through said at least one opening.

3. A machine as set forth in claim 1 in which said at least one receiving means comprises a receiving disbursing box for receiving therein a particular kind of note discriminated as normal and disbursing the notes therefrom, and a receiving box for receiving therein the normal notes discriminated to be different from said particular kind of note.

4. A machine as set forth in claim 1, wherein said at least one accumulating means comprises a first accumulating section for temporarily storing the normal notes discriminated through the discriminating means and a second accumulating section for temporarily storing the abnormal notes discriminated through the discriminating means.

5. A machine as set forth in claim 1, further comprising means for arranging all of the particular kind of notes in a condition where an obverse side of each note is positioned in a common direction.

* * * * *